US008868812B2

(12) United States Patent
Miskowicz et al.

(10) Patent No.: US 8,868,812 B2
(45) Date of Patent: Oct. 21, 2014

(54) INTERFACE FOR COMMUNICATION BETWEEN SENSING DEVICES AND I2C BUS

(75) Inventors: Marek Miskowicz, Cracow (PL); Dariusz Koscielnik, Cracow (PL)

(73) Assignee: Akademia Gorniczo-Hutnicza im Stanislawa Staszica, Cracow (PL)

( * ) Notice: Subject to any disclaimer, the term of this patent is extended or adjusted under 35 U.S.C. 154(b) by 259 days.

(21) Appl. No.: 13/260,269

(22) PCT Filed: Mar. 31, 2010

(86) PCT No.: PCT/PL2010/050014
§ 371 (c)(1),
(2), (4) Date: Dec. 7, 2011

(87) PCT Pub. No.: WO2010/114402
PCT Pub. Date: Oct. 7, 2010

(65) Prior Publication Data
US 2012/0084474 A1   Apr. 5, 2012

(30) Foreign Application Priority Data

Mar. 31, 2009   (PL) .................................... 387 661

(51) Int. Cl.
*G06F 13/14*   (2006.01)
*G06F 13/38*   (2006.01)
(52) U.S. Cl.
CPC .................................. *G06F 13/385* (2013.01)
USPC ........................................................ 710/305
(58) Field of Classification Search
USPC .......... 710/104–110, 305–317, 62–64, 72–74
See application file for complete search history.

(56) References Cited

U.S. PATENT DOCUMENTS

| 6,744,376 | B1* | 6/2004 | Pascalidis | ................ | 340/870.21 |
| 7,209,868 | B2* | 4/2007 | Kuo | .............................. | 702/189 |
| 7,504,972 | B2* | 3/2009 | Deligiannis | ................... | 341/131 |
| 7,539,804 | B2* | 5/2009 | Miura | ........................... | 710/110 |
| 7,948,413 | B2* | 5/2011 | Koscielnik et al. | ........... | 341/143 |
| 2010/0194613 | A1 | 8/2010 | Koscielnik et al. | | |

FOREIGN PATENT DOCUMENTS

WO          0013319          3/2000

* cited by examiner

*Primary Examiner* — Raymond Phan
(74) *Attorney, Agent, or Firm* — Ladas & Parry LLP

(57) ABSTRACT

A conversion module contains an asynchronous analog-to-digital converter (AADC) with the output signal generated at irregular time intervals, whose output is connected to the input of the buffer memory module (BUF), and the output of the buffer memory module (BUF) is connected through the internal bus (BUS) simultaneously to the source address module (SADR), to the configuration registers module (REG), to the control module of the interface (CM), which the reference generator (RG) is connected to, and to the destination address module (DADR), to the selection register module (SELREG), to the transmitter/receiver module (SDM), and moreover the control inputs/outputs (1, 2, ..., 8) of the control module (CM) are connected respectively to the asynchronous analog-to-digital converter (AADC), to the buffer memory module (BUF), to the source address module (SADR), to the configuration registers module (REG), to the destination address module (DADR), to the selection register module (SELREG), to the transmitter/receiver module (SDM), and to the clock control module (SCM), and on the other hand, the transmitter/receiver module (SDM) output is connected through the controller (SDD) to the data line (SDA) of the I2C bus whose clock line (SCL) is connected through the other controller (SCD) to the clock control module (SCD) output, and what is more the write control output (9) of the asynchronous analogto-digital converter (AADC) is connected to the write control input (10) of the buffer memory module (BUF).

1 Claim, 3 Drawing Sheets

Figure 1:
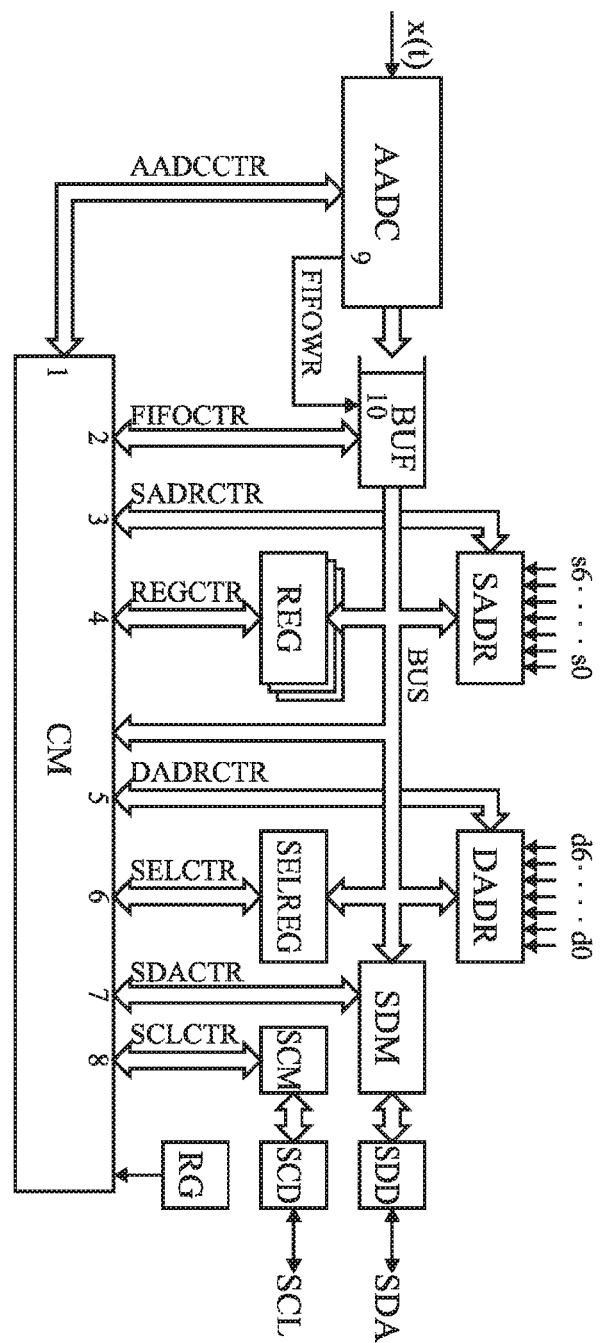

INTERFACE FOR COMMUNICATION BETWEEN SENSING DEVICES AND I2C BUS

This application is a 371 of PCT/PL2010/050014, filed on Mar. 31, 2010, which is incorporated herein by reference.

The subject of the invention is the interface for communication between sensing devices and the I2C bus used in systems of sensing devices for monitoring biomedical signals among others as well as for communication between sensors and actuators through the I2C bus in computer systems.

In the already known sensing systems the serial bi-directional synchronous I2C (Inter-Intergrated Circuit) bus developed by Philips Semiconductors is used to transfer digital data between the electronic devices. The digital data are transferred through the I2C bus after initiating the transmission by the Master device developed on the basis of a microcontroller or a processor. The Master devices collect measurement results from sensing devices including the analog-to-digital converters on which outputs data are generated as the digital words at regular time intervals.

The telemetric interface, known from the patent PL 196 405 description, enables the transfer of data representing results of biomedical measurements from the sensing device to the computer using radio communication. This interface has the pulse signal input which is connected to the module converting the pulse signal to the digital signal. The conversion module is connected through the buffer memory module to the output module which on the other hand is connected to the communication port of the personal computer. The multichannel digital-to-analog converter is also connected to the output of the module converting the pulse signal to the digital signal.

The interface, according to the invention, for communication between sensing devices and the I2C bus comprising a module that converts the measured analog signal to the digital signal whose input is connected to the sensor for measuring a given magnitude and whose output is connected to the buffer memory module is characterized by that a conversion module contains an asynchronous analog-to-digital converter with the output signal generated at irregular time intervals whose output is connected to the input of the buffer memory module, while the output of the buffer memory module is connected simultaneously through the internal bus to the source address module, to the configuration registers module, to the control module of the interface that the reference generator is connected to, and to the destination address module, to the selection register module, to the transmitter/receiver module.

The control inputs/outputs of the control module are connected respectively to the asynchronous analog-to-digital converter, to the buffer memory module, to the source address module, to the configuration registers module, to the destination address module, to the selection register module, to the transmitter/receiver module, and to the control module.

On the other hand, the transmitter/receiver module output is connected through the controller to the data line of the I2C bus whose clock line is connected through the other controller to the control module output. Moreover, the write control output of the asynchronous analog-to-digital converter is connected to the write control input of the buffer memory module.

The interface, according to the invention, thanks to the application of the address modules and thanks to appropriate modules controlling its operation works as the hardware Master which makes the communication between sensing devices and the I2C bus possible when digital data on the analog-to-digital converter are ready for the transmission and further processing. Moreover, the digital data are transmitted directly to the receiving device without unnecessary participation of any other Master device connected to the bus. Simultaneously, thanks to the use of the asynchronous analog-to-digital converters generating data on their outputs at irregular time intervals, the interface, according to the invention, enables the reduction of supply voltage of the circuit, and in consequence, it lowers power consumption for the same conversion performance compared to the synchronous analog-to-digital converters used up to now. Furthermore, thanks to the simplicity of the interface, there is no need to use microcontrollers that implement functionality of Master devices in simple monitoring and control systems.

Figure 2:
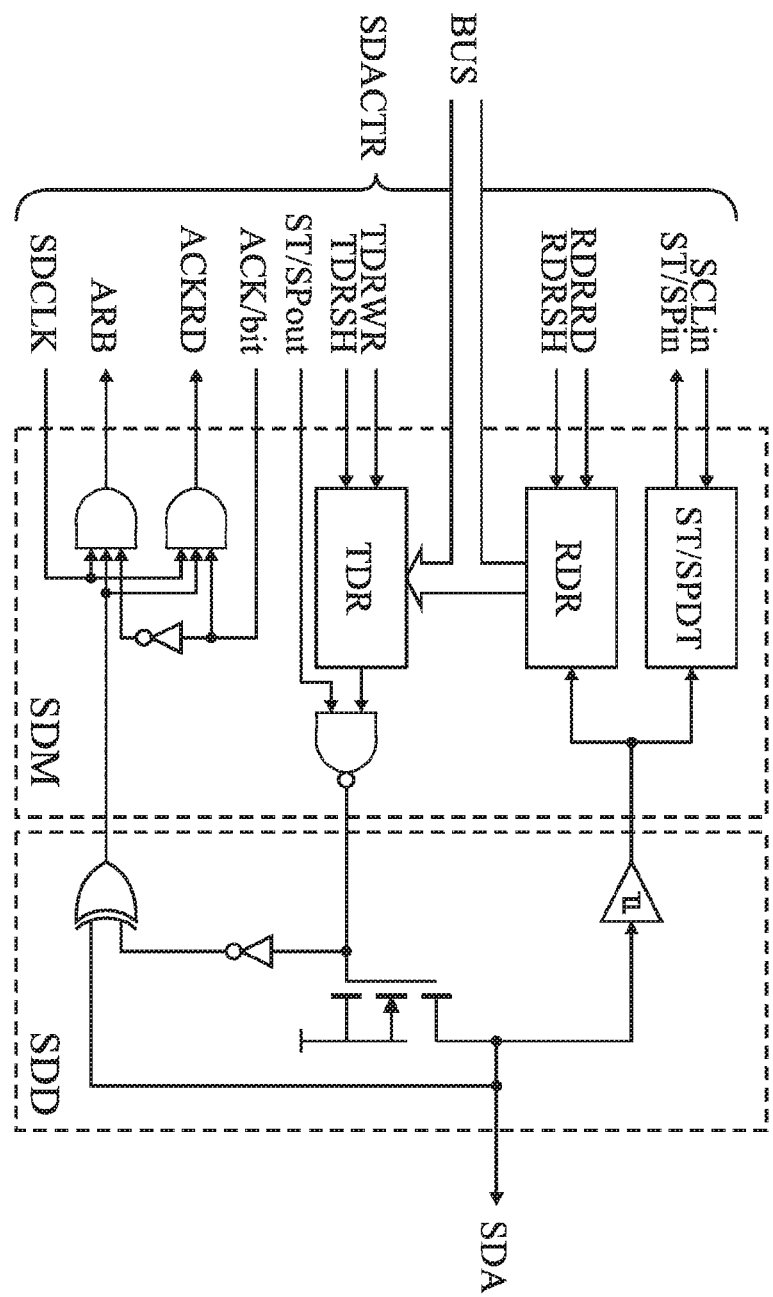
Figure 3:
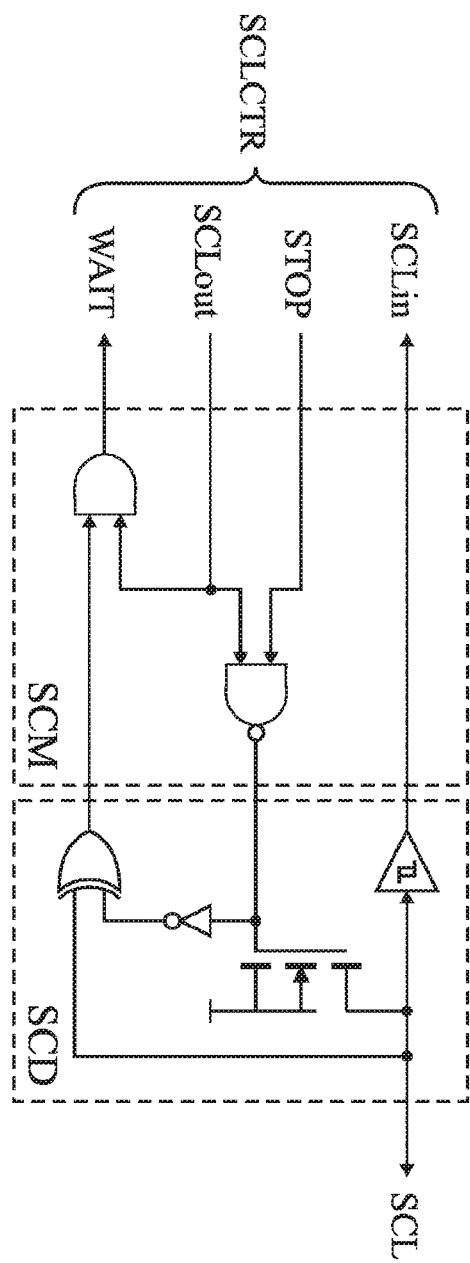

The solution, according to the invention, is presented in the embodiment and illustrated in figures as follows. The block diagram of the interface circuit is shown in FIG. 1, while the block diagram of the transmitter/receiver module with the data line controller is shown in FIG. 2. On the other hand, FIG. 3 presents the block diagram of the clock control module and the clock line controller of the I2C bus.

The interface, according to the invention, comprises an asynchronous analog-to-digital converter AADC generating output data at irregular time intervals whose output is connected to the input of the buffer memory module BUF of FIFO (First-in, First-out) type.

The output of the buffer memory module BUF is connected simultaneously through the internal bus BUS to the source address module SADR, to the configuration registers module REG, to the control module CM of the interface that the reference generator RG is connected to, and to the destination address module DADR, to the selection register module SELREG, to the transmitter/receiver module SDM.

The control inputs/outputs 1, 2, . . . , 8 of the control module CM are connected respectively to the asynchronous analog-to-digital converter AADC, to the buffer memory module BUF, to the source address module SADR, to the configuration registers module REG, to the destination address module DADR, to the selection register module SELREG, to the transmitter/receiver module SDM, and to the clock control module SCM.

The output of the transmitter/receiver module SDM is connected through the data line controller SDD to the data line SDA of the I2C bus. The clock line SCL of the I2C bus is connected through the clock line controller SCD to the output of the clock control module SCM. What is more, the write control output 9 of the asynchronous analog-to-digital converter AADC is connected to the write control input 10 of the buffer memory module BUF.

Firstly, the asynchronous analog-to-digital converter AADC of the interface, according to the invention, converts the analog input signal to the string of pulses, then to the digital signal organized in 8-bit words as a result of cyclic measurements of the pulse widths and the widths of the intervals between these pulses (FIG. 1). One-byte digital words, also called octets, are transferred subsequently to the buffer memory module BUF of FIFO (First-in, First-out) type going between in transmission of digital data to the internal bus BUS, while the asynchronous analog-to-digital converter AADC generates the control signal FIFOWR which adds the next word to the end of the buffer memory module BUF as soon as the successive conversion cycle is completed.

The control module CM of the interface controls the operation of the ADDC converter and the buffer memory module BUF using the signals AADCCTR and FIFOCTR respectively. The control module CM controls also the process of passing the first word waiting in the queue of the buffer memory module BUF to the internal bus BUS through which it is transferred to the transmit data register TDR of the transmitter/receiver module SDM (FIG. 2). The operation of the SDM module is controlled by the set of control signals SDACTR generated by the control module CM comprising the following signals: RDRRD, RDRSH, TDRWR, TDRSH, ST/SPout, ACK/bit, ACKRD, ARB, SDCLK, ST/SPin and SCLin.

During the interface operation, the presence of data ready for transmission to the I2C bus in the buffer memory module BUF is signaled by the buffer memory module BUF to the control module CM using the appropriate signal included in the set of control signals FIFOCTR.

Simultaneously, the data line controller SDD and the clock line controller SCD continuously monitor respectively the state of the data line SDA and the state of the clock line SCL of the I2C bus, and when on the basis of the output signals of the data line controller SDD and the clock line controller SCD, the transmission detector ST/SPDT of the SDM module detects the I2C bus to be idle which is signaled by the use of the ST/SPin line to the control module CM, then the transmission detector ST/SPDT of the SDM module using the signal ST/SPin causes that the control module CM produces the signal ST/SPout to the module SDM (FIG. 2) which results in the generation of the Start symbol on the output of the data line controller SDD where the signal ST/SPout is included in the set of control signals SDACTR.

After the generation of the Start symbol on the data line SDA, the control module CM of the interface on the basis of the signal from the reference generator RG generates the clock signal SCLout (FIG. 3) included in the set of control signals SCLCTR which is subsequently transferred through the clock control module SCM and through the clock line controller SCD to the clock line SCL.

At the same time, the control module CM using the signal TDRWR included in the set of control signals SDACTR and being synchronous with the signal SCLout causes the data octet to be written to the transmit data register TDR of the SDM module, while the data octet depending on a given transaction type in the I2C standard represents respectively the general call address of the I2C standard stored in the control module CM, or the address of a device being data receiver stored in the register of the destination address module DADR.

The address of the data receiver is made available from the register of the DADR module to the internal bus BUS as a result of activation of the DADR module output by the control module CM using the appropriate signal included in the set of control signals DADRCTR. The own address of the interface used for transmission in a general call mode is stored in the register of the source address module SADR. The value of the own address of the interface can be defined locally using the inputs s0-s6 of the register of the source address module SADR, or remotely by the other Master device connected to the I2C bus which is not shown in figures.

The address of the receiving device, which is a destination for data generated by the AADC converter, is stored in the destination address module DADR and is used for the direct transmission of data to the given receiver.

The value of the receiver address can be defined locally using the inputs d0-d7 of the register of the destination address module DADR, or remotely by the other Master device connected to the I2C bus.

The data available on the bus BUS are subsequently subjected to the parallel-to-serial conversion and transmitted serially on the data line SDA of the I2C bus after previous completion of each data octet with an extra bit of logical value equal to 'one' causing the data line SDA to be set to the inactive high state by the SDM module, and concurrently the receiving device is allowed to generate the acknowledge bit ACK.

The data from the transmit data register TDR of the SDM module are transmitted to the data line SDA synchronously with the clock signal passed to the clock line SCL, while shifting data stored in the TDR and transmitting successive bits of the transmitted octets are controlled by the control module CM by the use of the signal TDRSH included in the set of control signals SDACTR.

The state of the acknowledge bit ACK transmitted on the data line SDA by the receiving device is detected by the data line controller SDD, and then the signal obtained is transmitted through the transmitter/receiver module SDM to the control module CM using the signal ACKRD included in the set of control signals SDACTR.

If the signal ACKRD signals that the state of the acknowledge bit is active, that is, equal to zero, the control module CM of the interface makes data available from the buffer memory module BUF to the internal bus BUS using the appropriate signal included in the set of control signals FIFOCTR, and subsequently it causes writing data to the transmit data register TDR of the transmitter/receiver module SDM.

Next, the data written to the transmit data register TDR are transmitted to the data line SDA synchronously with the clock signal passed to the clock line SCL, while shifting data stored in the TDR and transmitting successive bits of the transmitted octets are controlled by the control module CM by the use of the signal TDRSH provided to the TDR register and included in the set of control signals SDACTR.

As soon as the last data bit of a given octet is transmitted, the TDR register transmits a bit of a high logical state which enables the receiving device to transfer the acknowledge bit ACK of successful reception of the interface address and to be ready to receive the next possible block of data, and afterwards, the cycle is repeated.

If the signal ACKRD signals that the state of the acknowledge bit is inactive, that is, equal to one, the control module CM of the interface terminates generating the signal SCLout and starts to generate the Stop symbol on the data line SDA by the use of the signal ST/SPout included in the set of control signals SDACTR.

Concurrently, during the transmission of every bit of the address octet or of the data octet and in the course of the duration of the clock line SCL in the high state, the data line controller SDD of the data line SDA compares continuously the logical state of the transmitted bits in each octet with the current logical state of the data line SDA.

If the logical states being compared are not the same during the transmission of any bit, then the transmitter/receiver module SDM generates the signal ARB causing that the control module CM terminates the generation of the signal SCLout passed further by the SCM and the SCD to the clock line SCL, and terminates the generation of the signal TDRSH shifting the content of the register TDR and next, the control module CM forces setting the TDR register output to the inactive high state by writing to the TDR register any word with the most significant bit equal to one.

Concurrently, the clock line controller SCD of the clock line SCL compares continuously the logical state of the clock signal transmitted to the clock line SCL and the logical state of the clock line SCL.

If the clock line SCL is pulled down by the other device to the low logical state during the transmission of the signal with high logical level to the clock line SCL, it means that any other device requests slowing down the transmission rate of data transferred by the interface, according to the invention.

Then, the controller SCD transmits the appropriate signal to the clock control module SCM which, on the other hand, generates the signal WAIT, included in the set of control signals SCLCTR, to the control module CM.

The signal WAIT causes that the control module CM terminates the generation of the successive pulses of the signal TDRSH shifting the content of the TDR register, and terminates the generation of the pulses of the signal SCLout until the signal WAIT is deactivated.

The data are also introduced from the I2C bus to the interface, according to the invention. These data contain the interface's own address, the receiver address to which the interface, according to the invention, transmits their data, and the configuration data that include operational parameters of the AADC converter, of the source address module SADR, of the destination address module DADR, of the selection register module SELREG.

If the controller SDD detects the change of the state of the data line SDA of the I2C bus from the state 'high' to the state 'low' while the state of the clock line SCL is high at the same time, it means that the symbol Start is transmitted on the line SDA. Afterwards, if the controller SCD detects the clock signal on the line SCL, then it means that the other Master device connected to the I2C bus has started the data transmission. Then, on the basis of the signal ST/SPin and the signal SCLin produced respectively by the transmitter/receiver module SDM (FIG. 2), and the clock control module SCM (FIG. 3), the control module CM generates the signal RDRSH synchronous with the signal SCLin.

The signal RDRSH after transmitting to the receive data register RDR of the SDM module causes the reception of data from the I2C bus by the register RDR, where the signals ST/SPin and RDRSH are included in the set of control signals SDACTR and the signal SCLin is included in the set of control signals SCLCTR.

Afterwards, the data octet which contains the address of the receiving device received by the receive data register RDR of the interface after the serial-to-parallel conversion is made available on the internal bus BUS by the control module CM using the signal RDRRD included in the set of control signals SDMCTR. Afterwards, the control module CM reads information from the internal bus BUS and compares the received address to the interface's own address.

If the address received from the data line SDA matches the own address of the interface stored in the source address module SADR, the control module CM by the use of the signal ST/SPout sent to the transmitter/receiver module SDM causes the pulling down of the data line SDA to the low state during the transmission of the acknowledge ACK bit meaning that the interface is ready to receive the next block of data.

If the address received from the data line SDA does not match the own address of the interface stored in the source address module SADR, the control module CM sends such signal ST/SPout to the input of the transmitter/receiver module SDM that the data line SDA of the I2C bus is set to the high state during the transmission of the acknowledge ACK bit meaning that the interface is not ready to receive the next block of data.

As soon as the interface, according to the invention, receives the address of the receiving device and sets the acknowledge bit ACK to zero on the data line SDA, and if the R/W bit following the receiver address set by the transmitting device is of low logical state, the successive data octet is introduced from the data line SDA of the I2C bus to the receive data register RDR by the use of the signal RDRSH.

This data octet contains the address of the register in the configuration registers module REG, or in the source address module SADR, or in the destination address module DADR that after the serial-to-parallel conversion is made available on the internal bus BUS by the control module CM using the signal RDRRD. Next, the control module CM generates the appropriate signal included in the set of control signals SELCTR which controls writing the state of the internal bus BUS to the selection register module SELREG.

Afterwards, the control module CM generates such signal ST/SPout to the transmitter/receiver module SDM that causes the data line SDA of the I2C bus to be pulled down to the low state during the transmission of the acknowledge ACK bit.

Subsequently, the successive data octet is written to the receive data register RDR by the use of the signal RDRSH. This octet is made available on the internal bus BUS after the serial-to-parallel conversion by the control module CM using the signal RDRRD. Next, the control module CM generates the appropriate signal which causes writing the state of the internal bus BUS to the appropriate register in the configuration registers module REG, or to the source address module SADR, or to the destination address module DADR, where the address of this register was previously defined by the data octet written to the selection register module SELREG.

Next, the control module CM generates such signal ST/SPout to the transmitter/receiver module SDM that causes the data line SDA of the I2C bus to be pulled down to the low state during the transmission of the acknowledge ACK bit. Subsequently, the control module CM increases the content of the register SELREG by one, and next, the cycle is repeated.

After writing data to any register in the configuration registers module REG, the control module CM by means of the appropriate signal included in the set of control signals REGCTR reads the data from that register in the configuration registers module REG whose state was modified.

On the basis of the data read from the register whose state was modified, the control module CM defines a new mode of the operation of the interface, or of the AADC converter by means of the set of control signals AADCCTR.

If the rate of the data transmitted by the other Master device connected to the I2C bus is higher than the rate of data reception by the interface, according to the invention, the control module CM using the signal STOP slows down the rate of the transmitted data by generating the signal of low logical state on the input line STOP of the clock control module SCM that causes extension of duration of low state of the current period of the clock on the clock line SCL of the I2C bus.

REFERENCE SIGNS

AADC—asynchronous analog-to-digital converter
BUF—buffer memory module
BUS—internal bus
SDM—transmitter/receiver module
SCM—clock control module
SDD—data line controller
SCD—clock line controller
CM—control module
RG—reference generator
SADR—source address module
DADR—destination address module
REG—configuration registers module
SELREG—selection register module
SDA—data line
SCL—clock line
ST/SPDT—transmission detector
RDR—receive data register TDR—transmit data register
1-8—control inputs/outputs of control module
9—write control output of asynchronous analog-to-digital converter
10—write control input of buffer memory module

The invention claimed is:

1. An interface for communication between sensing devices and an I2C bus, said interface comprising:

a conversion module that converts an analog signal to a digital signal, wherein an input of the conversion module is connected to the sensing device to measure a given magnitude, and wherein an output of the conversion module is connected to a buffer memory module;

wherein the conversion module contains an asynchronous analog-to-digital converter with an output signal generated at irregular time intervals, wherein an output of the asynchronous analog-to-digital converter is connected to an input of the buffer memory module, and an output of the buffer memory module is connected through an internal bus simultaneously to a source address module, to a configuration registers module, to a control module of an interface, to which a reference generator is connected, and to a destination address module, to a selection register module, to a transmitter/receiver module, and wherein control inputs/outputs (1, 2, . . . , 8) of the control module are connected respectively to an asynchronous analog-to-digital converter, to the buffer memory module, to the source address module, to the configuration registers module, to the destination address module, to the selection register module, to the transmitter/receiver module, and to a clock control module, and wherein the transmitter/receiver module output is connected through a data line controller to a data line of the I2C bus having a clock line that is connected through a clock line controller to an output of the clock control module, and wherein a write control output of the asynchronous analog-to-digital converter is connected to the write control input of the buffer memory module.

* * * * *